OR 3,837,728

United States
Logan et al.

[11] 3,837,728
[45] Sept. 24, 1974

[54] INJECTED CARRIER GUIDED WAVE DEFLECTOR

[75] Inventors: Ralph Andre Logan, Morristown; James Hoffman McFee, Colts Neck; Robert Edward Nahory, Lincroft; Martin Alan Pollack, Westfield, all of N.J.

[73] Assignee: Bell Telephone Laboratories, Incorporated, Murray Hill, Berkeley Heights, N.J.

[22] Filed: Sept. 26, 1973

[21] Appl. No.: 400,852

[52] U.S. Cl. ............... 350/96 WG, 350/1, 350/160
[51] Int. Cl. ............................................. G02b 5/14
[58] Field of Search ................... 350/96 WG, 160

[56] References Cited
UNITED STATES PATENTS
3,295,911  1/1967  Ashkin et al. .......... 350/96 WG UX
3,320,013  5/1967  Johnson .................... 350/96 WG X

*Primary Examiner*—John K. Corbin
*Attorney, Agent, or Firm*—Wilford L. Wisner; E. W. Adams, Jr.

[57] ABSTRACT

There is disclosed an injected carrier device for deflecting a guided beam of radiation, such as the 10.6 micron beam from a conventional carbon dioxide laser. The waveguide structure comprises a lightly doped gallium arsenide thin film formed on a lower refractive index aluminum gallium arsenide substrate. Free charge carriers are selectively injected into a localized region of the film laterally displaced from the center of the path of the beam therein. Sufficient densities of carriers are injected either optically or electrically to cause the beam to deflect within the plane of the film away from the localized region. Deflection angles of the order of 1° to 2° and response times as short as 6 nanoseconds have been experimentally obtained with the device.

8 Claims, 2 Drawing Figures

INJECTED CARRIER GUIDED WAVE DEFLECTOR

BACKGROUND OF THE INVENTION

This invention relates to guided optical wave deflectors and, more particularly, to guided optical wave deflectors involving the selective injection of free carriers into a thin-film semiconductive waveguiding medium.

In recent years, a variety of electro-optically controlled switches, modulators and deflectors have been proposed to manipulate guided electromagnetic waves in the ultraviolet, visible and infrared portions of the spectrum, referred to collectively as the optical region. The differences among these proposed devices relate largely to reducing power requirements and obtaining a more efficient interaction with the guided waves while, at the same time, maintaining relative simplicity and small size.

It is generally known that electro-optic devices become less effective as the wavelength $\lambda$ of the optical wave guided therein is increased. Typically, electro-optic device efficiencies vary as $1/\lambda^2$; thus, efficiencies decrease with increasing wavelengths. As a result of this fact, electro-optic devices have found limited use in practical systems employing relatively long wavelength beams, such as the 10.6 micron beam from a conventional molecular carbon dioxide laser.

To obtain a useful system at such wavelengths, P. K. Cheo, in Volume 22 of *Applied Physics Letters*, pages 241 through 244 (March 1973), has proposed an arrangement for deflecting a 10.6 micron beam in an electro-optic thin-film waveguide in which the deflection occurs in the plane of the film. The waveguide consists of a thin (approximately 20 microns thick) high-resistivity gallium arsenide (GaAs) electro-optic layer which is epitaxially grown on a lower refractive index heavily-doped GaAs substrate. An electrode formed on the upper surface of the high-resistivity GaAs film is used to apply an electric field at a right angle to the direction of the beam propagation in the film, and thus to vary, electro-optically, the propagation characteristics of the film. With an electrode length of 0.5 centimeter and a peak applied voltage of 50 volts, experimental results on this arrangement have shown that the 10.6 micron beam can be deflected away from the electro-optically active region of the waveguide by an angle of about 1.1 milliradians (i.e., 0.063°), as measured external to the film. Detector limited response times of about 60 nanoseconds (1 nanosecond = $10^{-9}$ second) were also observed.

Although the reported efficiencies obtained with the Cheo electro-optic deflector are encouraging, the device still has certain inherent limitations. Like conventional electro-optic devices, the Cheo electro-optic deflector has an efficiency which varies as $1/\lambda^2$. Thus, even though fairly efficient at 10.6 microns, the device is still better suited for use with shorter wavelength guided beams. Additionally, with the Cheo deflector, the reported angles of deflection are smaller, and the reported response times are longer than are desirable for many applications.

SUMMARY OF THE INVENTION

We have discovered an improved guided wave deflector which is ideally suited for deflecting relatively long wavelength optical beams. According to our invention, a guided optical beam is deflected in the plane of a thin semiconductive waveguiding film by selectively injecting into a localized region thereof suitable densities of free carriers.

In an illustrative embodiment of the invention, the waveguiding structure comprises a lightly doped gallium arsenide (GaAs) thin film which is epitaxially grown on a lower refractive index aluminum gallium arsenide ($Al_xGa_{1-x}As$) substrate. An optical beam, such as the 10.6 micron beam from a conventional $CO_2$ laser, is coupled into a guided mode propagating in the film. Free carriers (i.e., electrons and/or holes) are injected into a localized region of the thin GaAs film laterally displaced from the center of the path of the beam propagating therein. The carriers may be injected into the film either optically or electrically. Optical injection involves optically pumping the desired region of the film with a beam of radiation having a photon energy greater than the bandgap energy of the film material. Electrical injection is accomplished by disposing a contacting layer of $Al_xGa_{1-x}As$ over the desired region of the GaAs film to form a double heterostructure and by applying an appropriate forward bias voltage between the contacting layer and the substrate. In either case, sufficient densities of carriers can be injected into the film to cause the guided beam to deflect in the plane of the film away from the localized region. Deflection angles of approximately 1° to 2° measured external to the film have been observed in experimental devices of this type. Response times at least as short as 6 nanoseconds have also been observed.

In contrast to the conventional electro-optic effect, which becomes less efficient as the guided wavelength is increased, the free carrier effects responsible for the deflection in the devices of our invention increase with wavelength with an improvement factor proportional to $\lambda^2$. The devices are thus best suited for use with relatively long wavelength guided beams, particularly with the 10.6 micron beam from a conventional $CO_2$ laser. In fact, the injected carrier guided wave deflector of our invention has been found to be surprisingly superior to conventional electro-optic deflectors at 10.6 microns in that it yields at least order of magnitude larger deflection angles than the above-described Cheo deflector.

BRIEF DESCRIPTION OF THE DRAWINGS

These and other features and advantages of the invention will be better understood from the following detailed description taken in conjunction with the accompanying drawing in which.

DETAILED DESCRIPTION OF THE ILLUSTRATIVE EMBODIMENTS

Figure 1:
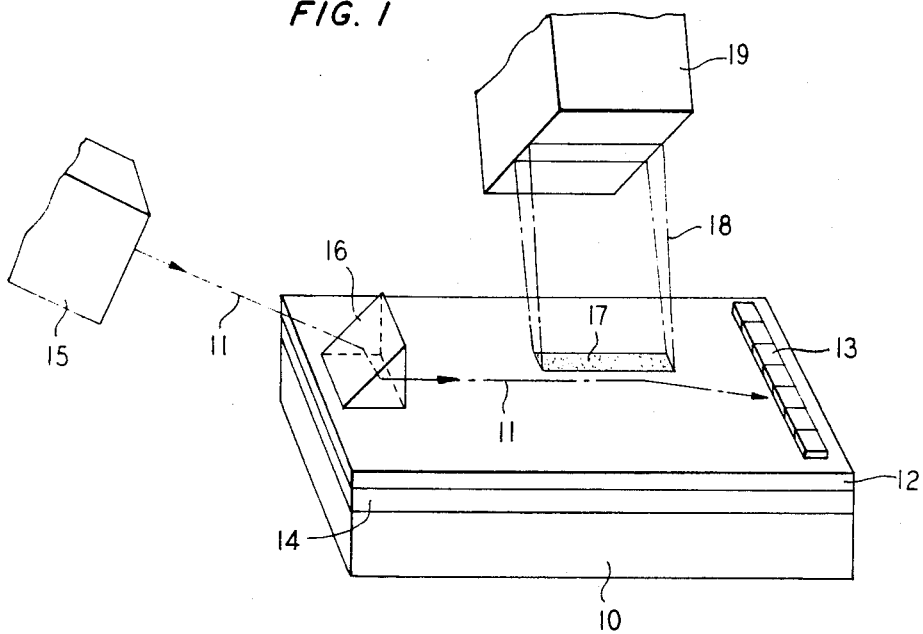
FIG. 1 is a pictorial illustration of an embodiment of the invention involving the optical injection of free carriers.

It is desired, in the illustrative embodiment of FIG. 1, to deflect guided optical beam 11 in the plane of thin waveguiding film 12 so that the beam will strike selected portions of target 13, which may be a series of miniature photodetectors, spatially separated strip waveguide channels, or other apparatus utilizing a deflected optical beam. The deflection is accomplished in a waveguiding structure comprising film 12 of a low optical loss semiconductive material which is formed on substrate 14 having a lower refractive index than that of the film. Both film 12 and substrate 14 are illustratively deposited on a suitable support 10 of substantial thickness. Film 12 is transparent to radiation of the wavelength of optical beam 11 and has a thickness generally of the order of the wavelength of beam 11 so as to be capable of confining the beam within that dimension.

Optical beam 11 is supplied from source 15 which is illustratively a laser, such as a conventional molecular carbon dioxide ($CO_2$) laser providing an output beam of 10.6 microns in wavelength in the infrared portion of the spectrum. The optical beam is coupled into a guided mode in film 12 by coupling prism 16. This coupling technique is now well known in the art and described in U.S. Pat. No. 3,584,230 issued to P. K. Tien on June 8, 1971.

The semiconductive material of film 12 is illustratively gallium arsenide, although it may be any semiconductive material having a suitable index of refraction and transparency at the wavelength of the beam to be deflected. The gallium arsenide material is only lightly doped because, as will be recognized by those skilled in the art, excessive doping impurity concentrations in the semiconductive film give rise to excessive absorption losses in the guided wave. Impurity concentrations in gallium arsenide film 12 of the order of $10^{16}$ $cm^{-3}$ or less are suitable. Film 12 illustratively has a thickness of approximately 10 microns and is several millimeters in width and length.

Substrate 14 is illustratively formed of aluminum gallium arsenide ($Al_xGa_{1-x}As$) and has a thickness comparable to that of film 12 (e.g., ~10 microns). The $Al_x$-$Ga_{1-x}As$ material has an index of refraction that is lower than that of the GaAs film 12 by an amount proportional to $x$, where $x$ is illustratively about 0.3. Both $Al_xGa_{1-x}As$ substrate 14 and GaAs film 12 can be grown into high optical quality layers by techniques well known in the semiconductor art (e.g., liquid phase epitaxy). Support 10 may be a relatively thick (e.g., 100 microns or more) GaAs seed crystal. Coupling prism 16 is illustratively formed of germanium.

To provide the desired deflection of beam 11 within the plane of film 12, free charge carriers (i.e., electrons and/or holes) are optically injected into localized region 17 of the film laterally displaced from the center of the path of beam 11 therein. Free carriers can be optically injected into film 12 by optically pumping region 17 with beam 18 from source 19 having a photon energy which exceeds the bandgap energy of the GaAs film 12 (i.e., 1.4 eV). Thus, source 19 is illustratively a pulsed ultraviolet nitrogen ($N_2$) laser providing beam 18 of 3371 A in wavelength with a power density variable up to about $5 \times 10^5$ watts per $cm^2$. The optical pulses produced with this laser have a pulse width of about 10 nanoseconds and a rise time of about 6 nanoseconds. Means, not shown, may be included with source 19 for focusing beam 18 to a thin, substantially rectangular cross-section. Pumped region 17 is illustratively about 3 millimeters in length and about 100 microns in width with its long dimension oriented essentially parallel to the direction of propagation of beam 11 in film 12. Free carrier densities up to about $10^{18}$ $cm^{-3}$ can be injected into localized region 17 of GaAs film 12 to a depth of about one micron in this way.

Our experimental studies of structures of the type shown in FIG. 1 and described illustratively hereinabove have shown that sufficient densities of free carriers can be injected into region 17 of film 12 over relatively short periods of time so that guided beam 11 is nearly completely deflected through relatively large angles away from the pumped region in the plane of the film. Specifically, with a pump power density of about $5 \times 10^4$ watts/$cm^2$ in beam 18 and with region 17 displaced about 400 microns to the side of the center of the path of beam 11 in film 12, deflection angles of the order of 1° to 2° were measured external to the film. These angles were measured after beam 11 was coupled out of film 12 with a coupling prism of the type of prism 16 disposed at the position of target 13 on the film. To our knowledge, these deflection angles are at least an order of magnitude greater than those observed at 10.6 microns in any similar prior art deflection device. Additionally, the deflection of guided beam 11 was observed to take place during the sharply rising leading edge of the $N_2$ laser pulse of beam 18. Thus, sufficient densities of carriers were injected into region 17 to cause nearly complete deflection of the guided beam over time periods of about 6 nanoseconds. This experimental observation gives the best indication to date of the response time of the injected carrier deflector of FIG. 1.

It was found that the manner and direction of the deflection of beam 11 depend upon the relative positions of pumped region 17 and the center of the path of beam 11 in film 12. For example, positioning pumped region 17 to the left of beam 11 causes it to deflect to the right in film 12, whereas when pumped region 17 is displaced to the right of beam 11, the beam is deflected to the left in the film. Thus, the total range of deflection in a device such as that illustrated in FIG. 1, in which the position of region 17 is variable, can be twice the maximum angle of deflection in one direction (e.g., ~4°). Centering region 17 along the center of the path of beam 11 in film 12 was found to cause the beam to deflect symmetrically into two side lobes spatially displaced by about one degree.

It was also found that by increasing the pump power density of beam 18, and thus by increasing the density of carriers injected into region 17, guided beam 11, in addition to being deflected, is attenuated to a greater extent due to free carrier absorption. For example, at a pump power density of about $5 \times 10^4$ watts/$cm^2$, beam 11 is deflected through the above-specified angles after passing region 17 with an attenuation due to free carrier absorption of only about 13 per cent. By increasing the pump power density an order of magnitude to $5 \times 10^5$ watts/$cm^2$, it was found that beam 11 could be attenuated completely (i.e., 100 per cent), the attenuation being due completely to free carrier absorption. Thus, by operating source 19 near its peak power density (i.e., $5 \times 10^5$ watts/$cm^2$), it is possible to block transmission of beam 11 in film 12 or to modulate its amplitude by modulating the power density of beam 18. For arrangements in which the beam deflection with low attenuation is desired, moderate pump power densities in beam 18 (e.g., $5 \times 10^4$ watts/$cm^2$ or less) are preferred.

Although the deflection angles of about one degree experimentally observed in this device of FIG. 1 were unexpected, they appear to be in reasonable agreement with subsequently calculated implications of electromagnetic theory. The presence of the injected carriers makes pumped region 17 a region of reduced index of refraction ($\Delta n < 0$). This fact accounts for the deflection of beam 11 away from region 17 at all times. A pump power density of about $5 \times 10^4$ watts/cm$^2$ in beam 18 is capable of producing a carrier density of about $5 \times 10^{17}$ cm$^{-3}$ in volume of GaAs film 12 below region 17 having a depth of about one micron below the upper surface of film 12. This, in turn, causes an index change $\Delta n/n$ in the volume of about $-.03$. We have calculated that this index change is capable of producing external deflection angles of the order of one degree in agreement with our experimental observations.

An additional desirable feature of the device of FIG. 1 is that the free carrier effects responsible for the deflection of the guided beam improve as the wavelength $\lambda$ of the guided beam is increased. Specifically, it can be shown that the magnitude of the change in index $\Delta n$ achievable in region 17 for a given density of injected carriers is proportional to $\lambda^2$. Thus, the longer the wavelength of the guided beam to be deflected, the lower the density of injected carriers required to provide the desired deflection. This feature makes the device of FIG. 1 especially attractive for deflecting relatively long wavelength beams such as the 10.6 micron beam from the $CO_2$ laser.

Figure 2:
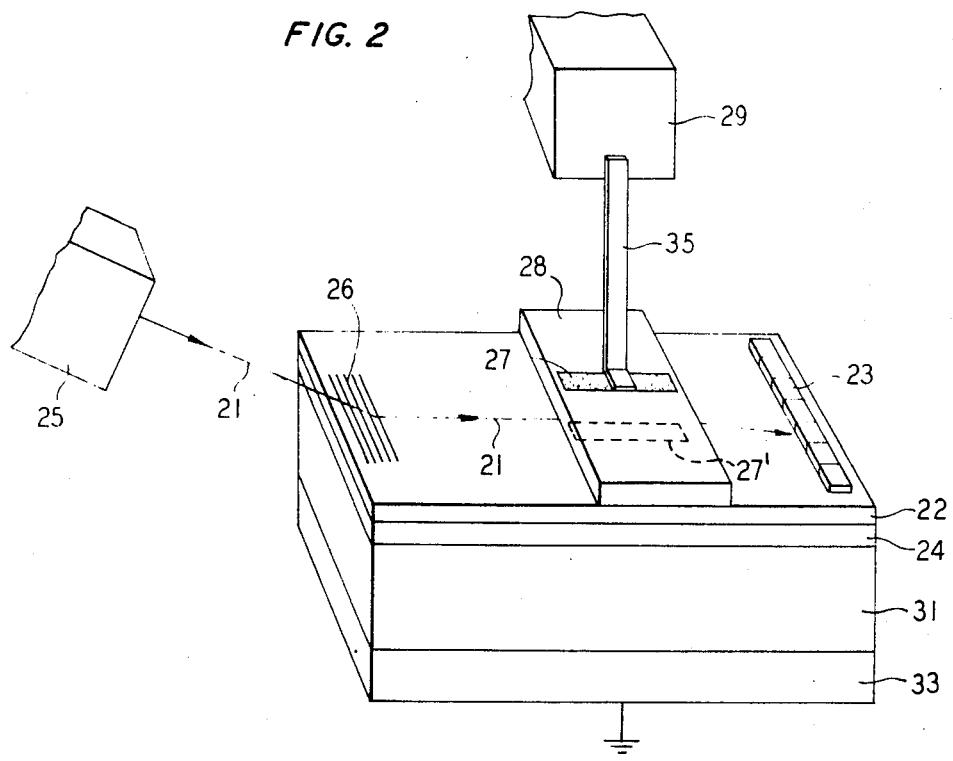
FIG. 2 is a pictorial illustration of an embodiment of the invention involving the electrical injection of free carriers.

FIG. 2 shows an illustrative embodiment of our invention in which free charge carriers are electrically injected into a localized region of a thin waveguiding film to deflect a beam propagating therein within the plane of the film. Like the embodiment of FIG. 1, the embodiment of FIG. 2 comprises thin waveguiding film 22 of a semiconductive material such as lightly doped gallium arsenide, which film is disposed on a lower refractive index substrate 24 of a material such as aluminum gallium arsenide. Beam 21 is supplied from source 25, which is again illustratively a $CO_2$ laser, and is coupled into a guided mode in film 22 by grating coupler 26. Grating coupler 26 is a well known alternative to the coupling prism for launching an optical beam into a thin-film waveguide. See U.S. Pat. No. 3,674,335, issued to A. Ashkin et al. on July 4, 1972. Target 23, like target 13 of FIG. 1, is positioned to receive deflected beam 21. The dimensions of film 22 are the same as those illustratively specified hereinabove for film 12 of FIG. 1.

To provide the desired deflection in the embodiment of FIG. 2, contacting layer 28 of a material such as aluminum gallium arsenide is disposed on the upper major surface of film 22 to form a double heterostructure of the type commonly used in GaAs-Al$_x$Ga$_{1-x}$As double heterostructure injection lasers. See, for example, Volume 42 of the *Journal of Applied Physics*, page 1929 (April 1971). Layer 28, like substrate 24, has an index of refraction which is less than that of film 22 so that beam 21 is confined in the film. Both layer 28 and substrate 24 are illustratively about 10 microns in thickness. Layer 28 is illustratively doped with impurities of one conductivity type (e.g., p-type impurities) and substrate 24 is doped with impurities of the other conductivity type (e.g., n-type impurities). Impurities such as germanium in contacting layer 28 and tin in substrate 24 can be used. Layer 31 of a material such as n-type GaAs and layer 33 of a metal-conducting material such as gold are respectively formed on the lower major surface of substrate 24 to provide structural support and to form a large area ohmic contact with the substrate. Thin (e.g., ~2 microns thick) strip 27 of a metal-conducting material such as gold is formed on the upper surface of layer 28 to form an ohmic contact therewith. Strip 27, like localized region 17 of FIG. 1, is illustratively positioned on layer 28 so that it is laterally displaced from the center of the intended path of beam 21 propagating in film 22 by about 400 microns. Strip 27 illustratively has a width, length and orientation which are the same as those specified hereinabove for region 17. An electrical lead 35 is attached to strip 27 by conventional soldering techniques in order to provide an electrical connection to a suitable source of voltage 29. Metal conducting layer 33 is illustratively electrically grounded.

When a forward-bias voltage is applied from voltage source 29 to strip 27, large densities of free charge carriers are electrically injected into a localized region of film 22 immediately below strip 27. This electrical injection of carriers into film 22 changes the transmission characteristics of the film in the same manner that the optical injection carriers change the characteristics of film 12 in FIG. 1. Thus, a localized volume of reduced index of refraction is induced in film 22 which serves to deflect beam 21 away from the volume in the plane of the film. The density of carriers in the localized volume and thus the magnitude of the index change $\Delta n$ can be varied by varying the magnitude of the applied voltage from source 29. With a forward current of about 1 ampere in a structure of the type shown in FIG. 2 and described illustratively hereinabove, we have experimentally observed deflection angles of the order of 1° to 2° upon coupling beam 21 out of the film with another grating coupler. It will be noted that these values are in excellent agreement with the experimental values obtained with the optically controlled embodiment of the invention shown in FIG. 1.

The electrically controlled embodiment of FIG. 2 has all of the advantages of the optically controlled embodiment of FIG. 1. For example, the position of beam 21 in film 22 can be shifted laterally with respect to strip 27 to vary the relative position of the beam and the active region of the film and thus to vary the direction and manner of deflection. Additionally, the electrical device of FIG. 2 would appear to be the more practical device since it does not require a separate source of radiation to provide the desired deflection in the waveguiding film. It is also more compatible with the planar geometries that have been proposed for future guided wave optical systems.

Numerous modifications and variations of the foregoing illustrative embodiments will be recognized by those skilled in the art without departing from the scope of the invention, as defined by the appended claims. For example, a plurality of localized injected carrier regions can be selectively provided at various positions along the waveguiding thin film of the above devices to vary and control the direction of propagation of the beam therein. Intricate optical circuit paths can be created in the film in this manner with the path of the beam being controlled by selectively varying the optical or electrical injection of carriers into the various localized regions. Moreover, since the guided beam is always deflected away from the localized injected carrier region in the film, it is possible to provide one such region in each of the two opposing sides of the center of the path of the beam in the film, thereby forming a controllable waveguide which laterally focuses and confines the beam in the area of the film between the two regions. In the embodiment of FIG. 2, for example, contacting layer 28 could be formed over substantially the entire upper surface of film 22 and two spaced-apart, parallel, elongated metal strips, such as strip 27 and strip 27', outlined in the drawing with a dashed line to indicate its optional character, could be formed on layer 28. Strip 27' would include an associated electrical lead (not shown), like lead 35, connecting it to voltage source 29. With the appropriate forward bias voltages applied at the strips, beam 21 can be made to follow the pattern of the strips in the film. By forming elongated, parallel strip patterns which bend in the plane of layer 28, beam 21 can be made to follow correspondingly curved paths in film 22. Similar effects could be provided with the optical injection of carriers utilizing a plurality of optical pumping beams like beam 18 of FIG. 1.

It should also be noted that a wide variety of semiconductive materials other than GaAs and $Al_xGa_{1-x}As$ can be used in the various embodiments of the invention. An indium gallium arsenide film ($In_xGa_{1-x}As$) formed between a GaAs substrate and a GaAs contacting layer would, for example, be a suitable double heterostructure for the embodiment of FIG. 2. Homostructures of materials such as germaium (Ge), silicon (Si), GaAs and other semiconductors would also be suitable for both described embodiments, the differing refractive indices being provided by differing dopant impurity concentrations in the various layers.

We claim:

1. Apparatus for deflecting a beam of optical electromagnetic radiation comprising a transparent substrate, a transparent film of a semiconductive material formed on a major surface of said substrate, said film having an index of refraction exceeding that of said substrate and a thickness of the order of the wavelength of the beam to be deflected, means for launching the beam to be deflected into a guided mode propagating in said film, means for selectively injecting free charge carriers into at least one localized region of said film disposed along the path of the beam therein, said carrier injecting means injecting a sufficient density of carriers to cause the beam to be deflected in the plane of said film away from said localized region.

2. The apparatus of claim 1 in which said carrier injecting means comprises a source of at least one beam of optical radiation for optically pumping said localized region of said film, said pumping beam having a photon energy exceeding the bandgap energy of the semiconductive material of said film.

3. The apparatus of claim 2 in which the semiconductive material of said film consists essentially of gallium arsenide and the material of said substrate consists essentially of aluminum gallium arsenide.

4. The apparatus of claim 3 in which the beam to be deflected has a wavelength of the order of 10 microns in the infrared portion of the electromagnetic spectrum.

5. The apparatus of claim 1 in which said substrate is formed of a semiconductive material of one conductivity type and said carrier injecting means comprises a contacting layer of a semiconductive material of the other conductivity type formed on the major surface of said film opposite to said substrate, said contacting layer having an index of refraction less than that of said film, and means for applying a forward bias voltage between at least one localized region of said contacting layer and said substrate to inject electrically into the localized region of said film a sufficient density of free charge carriers to deflect the beam.

6. The apparatus of claim 5 in which the semiconductive material of said film consists essentially of gallium arsenide and the semiconductive material of said substrate and said contacting layer consists essentially of aluminum gallium arsenide.

7. The apparatus of claim 6 in which the beam to be deflected has a wavelength of the order of 10 microns in the infrared portion of the electromagnetic spectrum.

8. The apparatus of claim 1 in which said carrier injecting means injects a sufficient density of carriers into two elongated, spaced apart localized regions of said film disposed on opposite sides of the path of the beam therein to confine the beam in the area of said film between said localized regions.

* * * * *